US010349236B2

(12) United States Patent
O'Donnell et al.

(10) Patent No.: US 10,349,236 B2
(45) Date of Patent: Jul. 9, 2019

(54) WEB-LEVEL ENGAGEMENT AND ANALYTICS FOR THE PHYSICAL SPACE

(75) Inventors: Colin O'Donnell, Brooklyn, NY (US); David Rocamora, Brooklyn, NY (US); Sholom Ellenberg, Mamaroneck, NY (US)

(73) Assignee: Intersection Design and Technology, Inc., New York, NY (US)

( * ) Notice: Subject to any disclaimer, the term of this patent is extended or adjusted under 35 U.S.C. 154(b) by 10 days.

(21) Appl. No.: 13/465,384

(22) Filed: May 7, 2012

(65) Prior Publication Data
US 2013/0107732 A1   May 2, 2013

Related U.S. Application Data

(60) Provisional application No. 61/553,617, filed on Oct. 31, 2011.

(51) Int. Cl.
*H04W 4/18* (2009.01)
*H04W 4/02* (2018.01)
*G06Q 30/02* (2012.01)

(52) U.S. Cl.
CPC .......... *H04W 4/18* (2013.01); *G06Q 30/0241* (2013.01); *H04W 4/02* (2013.01)

(58) Field of Classification Search
CPC ....................................................... H04B 5/00
USPC ......... 370/252, 259, 338; 709/203, 217, 218
See application file for complete search history.

(56) References Cited

U.S. PATENT DOCUMENTS

| | | | | |
|---|---|---|---|---|
| 6,484,148 B1* | 11/2002 | Boyd | ...................... | G06Q 30/02 340/8.1 |
| 2002/0077896 A1* | 6/2002 | Liu | ..................... | G06Q 10/0637 705/14.61 |
| 2005/0037775 A1* | 2/2005 | Moeglein | .............. | G01S 5/0036 455/456.1 |
| 2005/0122927 A1* | 6/2005 | Wentink | ............... | H04B 7/2126 370/311 |
| 2005/0218218 A1* | 10/2005 | Koster | .................... | G06F 3/147 235/383 |
| 2006/0183462 A1* | 8/2006 | Kolehmainen | .......... | H04B 5/00 455/411 |
| 2006/0224701 A1* | 10/2006 | Camp, Jr. | ............... | H04L 67/02 709/219 |
| 2007/0011268 A1* | 1/2007 | Banga | .................... | G06Q 30/02 709/217 |

(Continued)

*Primary Examiner* — Gregory B Sefcheck
*Assistant Examiner* — Jael M Ulysse
(74) *Attorney, Agent, or Firm* — Wolf, Greenfield & Sacks, P.C.

(57) ABSTRACT

According to one aspect, embodiments of the invention provide a system for providing user specific content, the system comprising a WIFI access node configured to be coupled to an external network and to receive a hardware address of at least one local mobile device attempting to connect to the external network via the WIFI access node, a content management system coupled to the WIFI access node, and a public channel coupled to the WIFI access node, wherein the content management system is configured to provide content related to a user of the at least one local mobile device to the public channel in response to the WIFI access node receiving the hardware address of the at least one local mobile device, and wherein the public channel is configured to display the content related to the user.

22 Claims, 5 Drawing Sheets

(56) References Cited

U.S. PATENT DOCUMENTS

| | | | | |
|---|---|---|---|---|
| 2008/0004888 A1* | 1/2008 | Davis | G06Q 20/3224 | 705/26.1 |
| 2008/0052168 A1* | 2/2008 | Peters | G06Q 30/02 | 705/14.53 |
| 2008/0077502 A1* | 3/2008 | Boyd | G06Q 30/02 | 705/14.54 |
| 2008/0109317 A1* | 5/2008 | Singh | G06Q 30/02 | 705/14.5 |
| 2008/0235351 A1* | 9/2008 | Banga | H04W 4/02 | 709/218 |
| 2009/0046677 A1* | 2/2009 | Toledano | H04L 29/08846 | 370/338 |
| 2009/0088182 A1* | 4/2009 | Piersol | H04W 48/12 | 455/456.1 |
| 2009/0093956 A1* | 4/2009 | Wu | G01C 21/20 | 701/469 |
| 2009/0197616 A1* | 8/2009 | Lewis | G06Q 30/02 | 455/456.1 |
| 2009/0257416 A1* | 10/2009 | Walker | H04W 8/20 | 370/338 |
| 2009/0288012 A1* | 11/2009 | Hertel | G06Q 20/02 | 715/738 |
| 2010/0114680 A1* | 5/2010 | Steelberg | G06Q 30/02 | 705/14.4 |
| 2010/0268768 A1* | 10/2010 | Kurtenbach | H04L 67/1097 | 709/203 |
| 2010/0280904 A1* | 11/2010 | Ahuja | G06Q 30/02 | 705/14.58 |
| 2011/0126119 A1* | 5/2011 | Young | G06F 17/30905 | 715/744 |
| 2011/0138064 A1* | 6/2011 | Rieger | G06F 17/30905 | 709/228 |
| 2011/0191432 A1* | 8/2011 | Layson, Jr. | G06Q 30/02 | 709/206 |
| 2011/0252101 A1* | 10/2011 | Davis | G06Q 10/107 | 709/206 |
| 2011/0267985 A1* | 11/2011 | Wilkinson | H04M 1/2535 | 370/259 |
| 2012/0022948 A1* | 1/2012 | Jones | G06Q 30/02 | 705/14.64 |
| 2012/0029691 A1* | 2/2012 | Mockus | G06Q 20/18 | 700/232 |
| 2012/0047011 A1* | 2/2012 | Rippetoe | G06Q 30/02 | 705/14.45 |
| 2012/0050039 A1* | 3/2012 | Mutch | G08B 27/005 | 340/540 |
| 2012/0066035 A1* | 3/2012 | Stanger | G06Q 30/0207 | 705/14.1 |
| 2012/0096490 A1* | 4/2012 | Barnes, Jr. | G06Q 10/02 | 725/34 |
| 2012/0157144 A1* | 6/2012 | Stanforth | H04W 16/14 | 455/512 |
| 2012/0252352 A1* | 10/2012 | Rao | G06Q 30/02 | 455/3.04 |
| 2013/0036207 A1* | 2/2013 | Wendt | H04L 67/327 | 709/220 |
| 2013/0065560 A1* | 3/2013 | Clark et al. | | 455/412.2 |
| 2013/0080259 A1* | 3/2013 | Durvasula | G06Q 30/0246 | 705/14.66 |
| 2013/0088192 A1* | 4/2013 | Eaton | G06F 1/266 | 320/108 |

* cited by examiner

WEB-LEVEL ENGAGEMENT AND ANALYTICS FOR THE PHYSICAL SPACE

RELATED APPLICATION

This application claims priority under 35 U.S.C. § 119(e) to U.S. Provisional Application No. 61/553,617, entitled "WEB-LEVEL ENGAGEMENT AND ANALYTICS FOR THE PHYSICAL SPACE," filed Oct. 31, 2011, which is hereby incorporated by reference in its entirety for all purposes.

BACKGROUND OF INVENTION

1. Field of the Invention

At least one example in accordance with the present invention relates generally to an engagement system for gathering analytics of a user.

2. Discussion of Related Art

Marketing and advertisement displays are often utilized to provide information to individuals as they pass by or view content on the display. Marketing and advertisement displays may include digital signage such as LCD, LED, plasma or projection based displays. Such displays are typically located in public and private environments, such as retail stores, hotels, restaurants, buildings, performance venues, transit stations, etc. and are configured to provide a desired message to potential patrons as they view the display.

SUMMARY

As described below, embodiments herein provide an engagement system for identifying users based on their mobile devices' hardware address, selecting and delivering tailored content and marketing to the user's physical space and/or mobile device, and gathering passive (presence) and/or active (usage) analytics.

Aspects in accord with the present invention are directed to a system for providing user specific content, the system comprising a WIFI access node configured to be coupled to an external network and to receive a hardware address of at least one local mobile device attempting to connect to the external network via the WIFI access node, a content management system coupled to the WIFI access node, and a public channel coupled to the WIFI access node, wherein the content management system is configured to provide content related to a user of the at least one local mobile device to the public channel in response to the WIFI access node receiving the hardware address of the at least one local mobile device, and wherein the public channel is configured to display the content related to the user.

According to one embodiment, the hardware address is a Media Access Control (MAC) address. In another embodiment, the public channel is a digital sign.

According to one embodiment, the system further comprises a database coupled to the WIFI access node and wherein the WIFI access node is further configured, in response to receiving the hardware address of the at least one local mobile device, to create a profile within the database associated with the at least one local mobile device. In one embodiment, the profile includes the hardware address of the at least one local mobile device, a location of the at least one local mobile device, and a time at which the WIFI access node received the hardware address of the at least one local mobile device.

According to another embodiment, the content related to the user of the at least one local mobile device which is provided to the public channel includes information associated with at least one of the hardware address of the at least one local mobile device, the location of the least one local mobile device and the time at which the WIFI access node received the hardware address of the at least one local mobile device. In one embodiment, the content provided by the content management system to the public channel is retrieved by the content management system from the database. In another embodiment, the content provided by the content management system to the public channel is received by the content management system from the external network.

According to one embodiment, the WIFI access node is further configured to connect the at least one local mobile device to the external network and to monitor usage information of the at least one local mobile device over the external network. In one embodiment, the profile further includes the usage information and wherein the content related to the user of the at least one local mobile device which is provided to the public channel further includes information associated with the usage information.

According to another embodiment, the WIFI access nodes is further configured to connect the at least one local mobile device to the external network upon the user providing credential information to the WIFI access node. In one embodiment, the profile further includes the credential information and wherein the content related to the user of the at least one local mobile device which is provided to the public channel further includes information associated with the credential information.

Another aspect in accord with the present invention is directed to a method for gathering analytic data, the method comprising acts of receiving wirelessly, with a server, a hardware address of at least one mobile device which is within a proximity of the server and which is attempting to connect to the server, and recording, absent connection of the at least one mobile device to the server, the hardware address, a location of the at least one mobile device, and a time at which the server received the hardware address, in a database.

According to one embodiment, the method further comprises acts of retrieving, in response to receiving, content associated with a user of the at least one mobile device, and providing the content to the user of the at least one mobile device. In one embodiment, providing the content to the user includes transmitting the content to at least one of the at least one mobile device and a public channel.

According to another embodiment, the retrieved content is based on at least one of the received hardware address, the location of the user, and the time at which the hardware address was received. In one embodiment, the content is retrieved from at least one of the database or an external network.

According to one embodiment, the method further comprises acts of connecting the at least one mobile device to an external network via the server, and monitoring usage information of the at least one mobile device over the external network, wherein the retrieved content is further based on the usage information. In one embodiment, the act of connecting includes receiving registration information from the user and wherein the retrieved content is further based on the registration information.

One aspect in accord with the present invention is directed to a system for providing user specific content, the system comprising, a server configured to be coupled to an external network and to receive a hardware address of a first local mobile device attempting to connect to the external network via the server, a public channel coupled to the server, and means for providing user specific content to the public channel in response to receiving the hardware address.

According to one embodiment, the user specific content is based on at least one of an identification of the first local mobile device, a location of the first local mobile device, and a time at which the server received the hardware address of the first mobile device. In one embodiment, the user specific content is based on a discovery pattern associated with at least one of the identification the first local mobile device, the location of the first local mobile device, and the time at which the server received the hardware address of the first local mobile device.

According to another embodiment, the user specific content is based on usage information of the first local mobile device over the external network. In another embodiment, the user specific content is based on credential information of a user of the first local mobile device.

According to one embodiment, the server is further configured to receive a hardware address of a second local mobile device attempting to connect to the external network via the server and wherein the user specific content is based on an association with the second local mobile device. In one embodiment, the user specific content is based on transaction information related to a user of the first local mobile device. In another embodiment, the transaction information includes Near Field Communication (NFC) transaction information.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
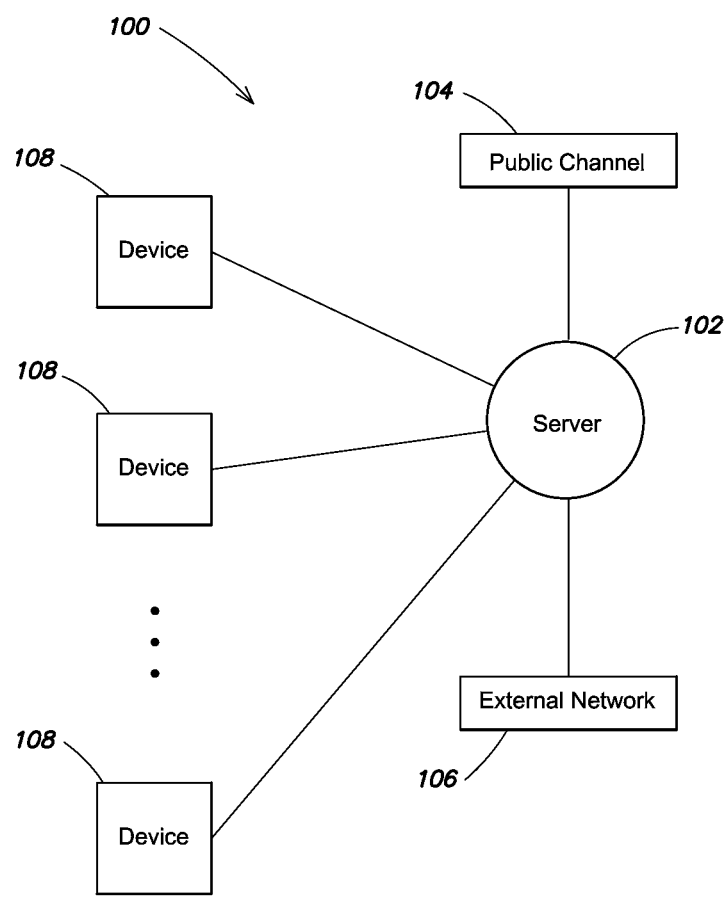
FIG. 1 is a block diagram of an engagement system in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As described above, marketing and advertisement displays are often utilized to provide information to nearby individuals. However, common marketing and advertising displays are typically either static (e.g., posters, signs, pre-programmed digital displays etc), not tailored to a specific individual, or require input from an individual to provide user specific content. This limits the value and the amount of content that the displays are able to provide.

Embodiments described herein provide an engagement system for identifying users based on their mobile devices' hardware address, selecting and delivering tailored content and marketing to the user's physical space and/or mobile device, and gathering passive (presence) and/or active (usage) analytics.

FIG. 1 illustrates a block diagram of an engagement system 100 in accordance with aspects of the present invention. The engagement system 100 includes a server 102 coupled to an external network (e.g., a Local Area Network (LAN), a Wireless Local Area Network (WLAN), a Virtual Local Area Network (VLAN), the internet, etc.) and a public channel 104. According to one embodiment, the public channel is a device, typically located in a public setting, which is capable of broadcasting information to local users in its vicinity. For example, in some embodiments, the public channel is a video display or electronic sign in a retail store, a light or sound in a public transit station, a speaker in a waiting room, or any other device capable of disseminating information publicly to individuals in its presence.

The server 102 of the engagement system 100 also includes a WIFI access point, configured to communicate wirelessly with a plurality of mobile user devices 108. According to one embodiment, the WIFI access point is included within the server 102. According to another embodiment, the WIFI access point is located external from the server 102. According to some embodiments, the mobile user devices may include any mobile device (e.g., a mobile phone, laptop, etc.) capable of communicating wirelessly with the server 102 (e.g., via a WIFI connection).

Typically, WIFI enabled mobile devices continuously broadcast hardware information (e.g. a hardware address) into the surrounding area in an effort to be discovered by, and connect with, nearby wireless networks. For example, a WIFI enabled mobile device commonly broadcasts its Media Access Control (MAC) address to the surrounding area so that any capable WIFI access node within the area can receive the MAC address and upon initiation by the user of the mobile device, use the MAC address to form a communication channel to the mobile device.

However, even though a mobile device is WIFI-enabled (and therefore may continuously be broadcasting its MAC address) and a WIFI access node senses the MAC address of a mobile device in its presence, oftentimes the communication channel is not established as the user does not take the required steps to initiate formation of the communication channel and/or the user is not within range of the access point long enough for the communication channel to be created. Nevertheless, as described herein, the mere sensing of MAC addresses by the server 102 may be useful information that may be used by an advertising or marketing system.

The server 102 is configured to identify the presence of specific mobile devices 108 by sensing the MAC address transmissions from the mobile devices 108. According to one embodiment, based on the received MAC addresses and/or additional information received from the user or an external third party (e.g., via the external network 106), the server 102 may provide user specific content to the user. In one embodiment, the user specific content is provided directly to the mobile device 108 of the user. In another embodiment, the user specific content is provided to the user through a public channel 104 located near the user. Additional details of the user specific content and how it is retrieved and provided to a user is discussed below in relation to FIG. 2.

Figure 2:
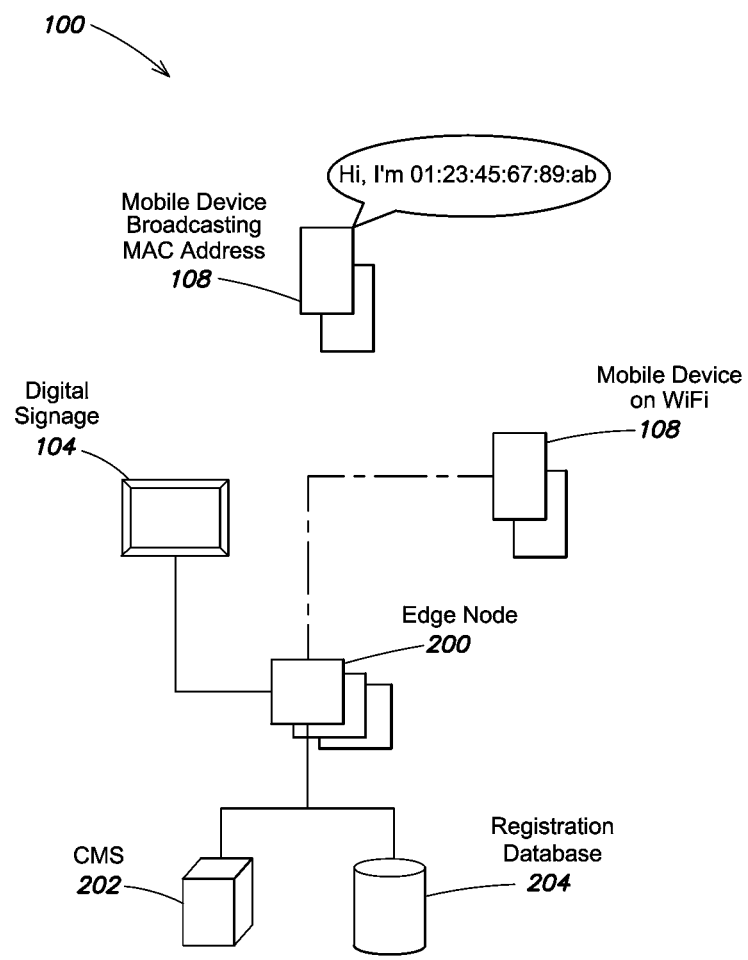
FIG. 2 is a more detailed block diagram of an engagement system in accordance with aspects of the present invention.

FIG. 2 is a more detailed block diagram of an engagement system (e.g., engagement system 100) in accordance with various aspects of the present invention. The server 102 (as seen in FIG. 1) of the engagement system 100 may include a WIFI access node 200 coupled to a Content Management System (CMS), a registration database 203 and a digital sign 104 (i.e. a public channel).

As discussed similarly above, the WIFI access node 200 is configured to communicate wirelessly with a plurality of mobile user devices 108. The mobile user devices 108 (e.g., mobile phones, laptops, tablets, etc.) continuously broadcast their identity (via their MAC address or any other public network broadcast) in an attempt to be discovered by the WIFI access node 200. Upon being discovered by the WIFI access node 200, a communication channel may be created between the WIFI access node 200 and the mobile user device 108, allowing the mobile user device 108 to join any wireless network provided by the WIFI access node 200 and retrieve content stored locally on the WIFI access node 200 or web content (proxied through the WIFI access node 200) from the external network 106. According to one embodiment, a user may be required to provide credentials prior to joining a wireless network of the WIFI access node 200 or accessing content.

The WIFI access node 200 is a wireless device that creates at least one wireless network accessible by mobile user devices 108 and provides network services (e.g., an HTTP server). The WIFI access node 200 senses the MAC addresses of mobile user devices 108 that have requested to be discovered and according to one embodiment, node 200 stores a log of the MAC addresses. Upon being discovered, a user of a mobile user device 108 may elect to join a network provided by the WIFI access node 200.

According to one embodiment, for any mobile user device 108 that is discovered, the WIFI access node 200 stores metrics (e.g., in a local database of node 200 or in the registration database 204) related to the mobile user device 108 such as the device 30 identifier (e.g., MAC address), timestamp, location, and the length of time that the mobile user device 108 is in the presence of the WIFI access node 200.

According to another embodiment, if the mobile user device 108 actually connects to the network provided by the WIFI access node 200, the WIFI access node 200 is able to retrieve additional information about the mobile user device 108 and store additional metrics related to the mobile user device 108. The additional metrics may include the type of mobile user device 108 operated by the user, usage information of the mobile user device, content interacted with over the network provided by the WIFI access node 200 (e.g., via a web browser), content exposed to via the network, results of games, surveys and polls interacted with via the network, and session cookies.

In another embodiment, if the WIFI access node 200 requires a user to enter credentials (e.g., via a registration or login process) prior to joining the network provided by the WIFI access node 200, the WIFI access node 200 is able to compile even more information about the mobile user device 108 and the user, and log additional metrics related to the mobile user device 108 and the user. The additional metrics may include the name of the user, the email of the user, and other personal information such as associated social media accounts.

According to one embodiment, the WIFI access node 200 stores logged metrics in a local cache or database. In this way, the WIFI access node 200 is able to keep track of mobile user devices 108 and users that the node detects frequently and can quickly access the information related to the frequently detected mobile user devices 108.

According to another embodiment, the WIFI access node 200 also stores logged metrics in the registration database 204. In one embodiment, the registration database 204 is a central registration database capable of communicating with multiple WIFI access nodes 200 and storing information received from the multiple WIFI access nodes. According to one embodiment, the WIFI access node 200 updates the registration database 204 periodically. According to another embodiment, the registration database 204 is located at a different location than the WIFI access node 200 and is configured to store information from multiple WIFI access nodes 200. In this manner, a rich database of device and their associated metrics may be maintained and used by various systems.

The WIFI access node 200 generates profiles for each MAC address (i.e. mobile user device 108) that node 200 detects and stores relationships between the MAC addresses and the logged metrics (e.g., time, geolocation, duration of stay, use, content, personal information, among other types of metrics) collected by the WIFI access node 200 in the registration database 204. According to one embodiment, profiles in the registration database contain at least the following fields: device identifier, timestamp, and location. However, the database 204 is extensible and may contain additional information regarding additional metrics as described above.

The profiles stored in the database 204 may also be augmented by information available through public sources or from a third party via the external network 204. For example, a profile stored in the registration database 204 by a WIFI access node 200 of a retailer, which is related to a specific mobile user device 108 and user (i.e., due to a prior 10 registration), may be updated via the external network 106 to include prior purchase information from another retailer or a list of other locations visited (e.g., sensed by other WIFI access nodes 200). According to one embodiment, local content of the WIFI access node 200 may also be updated periodically via the external network 106.

According to one embodiment, the registration database 204 provides an Application Programming Interface (API) allowing other applications or systems to retrieve data from the database 204. For example, an application desiring information regarding a specific mobile user device 108 or a specific user may submit a request to the registration database 204 for information regarding that device or user. In another example, an application may request information about all of the sensed devices 108 at a specific WIFI access node 200 over a given period of time.

According to one embodiment, the registration database 204 may require the requesting party to provide the registration database 204 with additional information in exchange for the requested information. For example, the registration database 204 may require that the requestor provide at least a device identifier, timestamp and geolocation to be able to access information in the database 204. In another example, the more info the requestor wants, the more information the registration database 204 may require the requestor to provide. According to one embodiment, some information stored in the database 204 may be restricted to outside access. In another embodiment, information provided to a requestor may be generalized information (e.g., to address privacy concerns). For example, if usage analytics are requested, the system may provide a general profile type of a user (e.g., urban man, age 30-40 with an interest in technology), rather than actual usage data. Also, according to another embodiment, access to the registration database 204 may be provided in exchange for a fee.

Based on the sensed mobile user devices 108 that are in the presence of a WIFI access node 200 and any metrics stored in the local cache or registration database related to the sensed mobile user devices 108 (e.g., in a profile previously saved in the registration database), the Content Management System (CMS) 202 controls the content that is delivered to the user (e.g., via the mobile user device 108 or the public channel 104) from the WIFI access node 200. According to one embodiment, the CMS 202 is located at a different location than the WIFI access node 200 and is configured to manage the content provided to multiple users via multiple WIFI access nodes 200.

Based on the logged metrics related to the mobile user devices 108 and/or the users, the WIFI access node 200 provides user specific content to at least one user in its presence. According to one embodiment, based on the metrics, the WIFI access node 200 provides local content (e.g., video, text or audio) which is stored in the WIFI access node or a local storage unit (e.g., a hard drive) to a user in its presence. In another embodiment, based on the logged metrics, the WIFI access node 200 acts as a proxy server to control access to the external network 106 (e.g., the internet or another local network) to direct user specific content from the network to a user in its presence or to send control signals to another external device via the external network.

According to one embodiment, when more than one device 108 is discovered by the WIFI access node 200, the WIFI access node may provide user specific content simultaneously to each device (e.g., via each one of the devices 108). However, where two or more devices 108 are discovered and the WIFI access node 200 desires to provide different content to each of the devices 108 at the same time via a single public channel display 104, the CMS 202 may control content provided by the WIFI access node 200 so that public channel 104 display is divided into a number of segments based on the number of devices. For example, if the WIFI access node 200 desires to provide user specific content to three users in its presence, the CMS 202 may control the content displayed so that the public channel display is divided intro three segments, each for displaying content to one of the different users.

Alternatively, according to one embodiment, where two or more devices 108 are discovered and the WIFI access node 200 desires to provide different content to each of the devices 108 at the same time via a single public channel display 104, the CMS 202 may control content to only be provided to a higher priority user. For example, if the WIFI access node 200 desires to provide user specific content to two different users in its presence, the CMS 202 may control the content displayed so that only a user that has previously provided his credentials to the WIFI access node 200 will be shown the related user specific content.

Additionally, according to another embodiment, where two or more devices 108 are discovered, the WIFI access node 200 may recognize usage data that is common to a group of identified users (i.e. common denominators) and provide content to each one of the users relative to the common denominator. For example, if the WIFI access node 200 recognizes a plurality of users within the same location, each of which has a corresponding profile indicating that the user is interested in football, then the WIFI access node 200 may provide football related content to the mobile user device 108 of each user or to the public channel 104.

As discussed above, user specific content may be provided to a public channel 104 within the vicinity of a desired mobile user device 108. The public channel 104 in which content is displayed may be determined by the MAC addresses received from mobile user devices 108 and the location of the devices. According to one embodiment, the public channel 104 is a digital sign or video display. In another embodiment, the public channel 104 is a speaker. According to one embodiment, the public channel 104 may include integrated sensors such as Infrared (IR) motion cameras to capture user metrics (e.g., such as the presence or identification of a user).

According to one embodiment, a single WIFI access node 200 of an engagement system 100, having a plurality of WIFI antennas or wireless access points, may be fixed in a centralized location (e.g., at the center of a retail location). According to another embodiment, a smaller and more mobile installation includes a single WIFI access node 200 comprising a small computer including one or more wireless cards and wireless modems.

According to one embodiment, an organization interested in growing its registration database, may provide a WIFI access node 200 to a location. In exchange for free WIFI service, users of WIFI at the location are required to register before they can use the WIFI network. The mobile user device 108 information of registered users is sensed (as described above) and the provided registration information can be sent to and stored in the organizations registration database.

Figure 3:
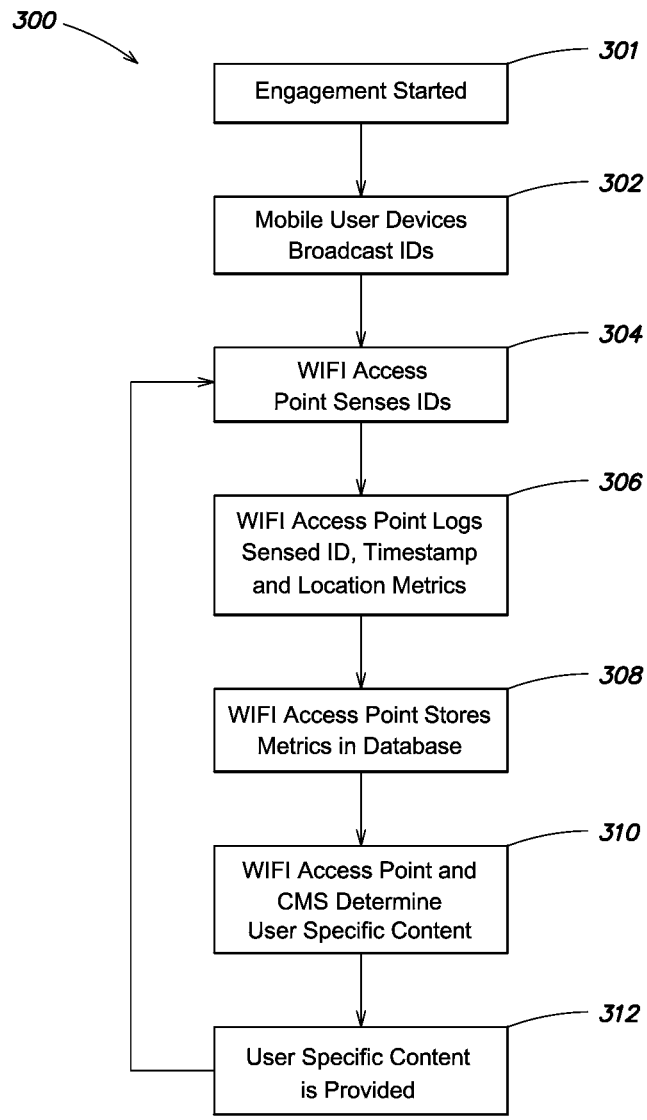
FIG. 3 is a flow chart illustrating an engagement process for gathering passive analytics in accordance with aspects of the present invention.

FIG. 3 is a flow chart 300 illustrating an engagement process for gathering passive analytics in accordance with one embodiment of the present invention. At block 301, the engagement process for gathering passive analytics is started, for instance, at an engagement system 100 installed at a location.

At block 302, mobile user devices 108 at the location broadcast identification information (e.g., a MAC address) in an attempt to be discovered by a wireless access point. Even if the user of the mobile user device 108 is not actively trying to connect to a wireless network (e.g., the mobile user device is currently not being operated by the user), the mobile user device 108 may still be broadcasting its identification information and information may be collected regarding the presence of the mobile user device 108.

At block 304, the WIFI access node 200 senses identification information broadcasted by any mobile user devices 108 within its broadcast range.

At block 306, upon sensing that at least one mobile user device 108 is in its presence, the WIFI access node 200 logs the sensed identification information the node receives from the mobile user device along with additional sensed timestamp and location metrics. The timestamp metric may be determined by the time at which the mobile user device 108 came within range of the WIFI access node 200. The location metric may be determined by the location of the mobile user device 108. According to one embodiment, the location of the mobile user device 108 may be determined by which WIFI access node 200 sensed the identification information broadcast by the mobile user device 108. For instance, the location of the mobile user device 108 may be assumed to be near or proximate the location of the WIFI access node 200. In another embodiment, the mobile user device 108 may provide location information to the WIFI access node 200, or any other system element.

At block 308, the WIFI access node 200 stores the logged metrics in the registration database 204. As discussed above, the stored metrics may be used to provide user specific content to the user of the mobile user device 108. In addition, as also discussed above, the stored metrics may be accessed by a third party.

At block 310, based on which mobile user devices 108 are within range of the WIFI access node 200 and on the stored metrics, the CMS 202 and the WIFI access node 200 determine which user specific content to provide to the users of the mobile user devices 108. According to one embodiment, the content may be local content provided by the engagement system 100 or content from the external network 106.

At block 312, the user specific content is provided to at least one of the mobile user devices 108 within range of the WIFI access node 200. As discussed above, the user specific content may be provided to one or more of the mobile user devices 108 directly. The content may also be broadcast to the public over a public channel 104 such as a public video display or speaker. In addition, the content may be in the form of signals sent to control an external device. As a result, merely by being within the broadcast range of the WIFI access node 200, the WIFI access node is able to gather information regarding a mobile user device 108 and its user, and in response, provide user specific content.

According to one embodiment, the WIFI access node 200 is used to passively collect usage analytics. For example, an installer of the WIFI access node 200 may want to know how many people visited his/her establishment during a certain period of time. By passively sensing a number of MAC addresses of mobile user devices 108 that are within the broadcast area of a WIFI access node during a certain time period, the WIFI access node 200 is able to determine how many people visited the establishment during the desired period of time, without requiring the visitors to register or login.

In another example, the WIFI access node 200 is used to passively track how long individuals are visiting a certain establishment. By passively sensing a MAC address of a mobile user device 108 and logging the time that the mobile user device 108 came into range of the WIFI access node 200 and the time that the mobile user device 108 went out of range of the WIFI access node 200 (e.g., via timestamps), the WIFI access node 200 is able to determine the length of the user's stay without the need for the user to log or check in.

In response to the length of stay of the user, determined by identification and timestamp metrics, user specific content may be displayed on the public channel 104 closest to the user. For example, if the WIFI access node 200 determines that a user is exiting the store after a short visit (e.g., determined by timestamp metrics), content wishing the user a good day or trying to persuade the user to return may be displayed on the public channel 104 closest to the user (e.g., determined by a location metric).

In another embodiment, the engagement system 100 is used to identify reoccurring events. For example, the WIFI access node 200 may be used to identify reoccurring visitors. If, over a period of time, the WIFI access node 200 repeatedly senses the presence of a certain mobile user device 108 (e.g., once a day), the WIFI access node 200 is able to determine that the user with the reoccurring mobile user device 108 is a returning visitor. In response to sensing a reoccurring visitor (i.e., a reoccurring MAC address), specific content related to the fact that the visitor is a reoccurring customer may be displayed on a public channel 104 close to the user. For example, upon sensing the arrival in a store of a reoccurring customer, a more familiar welcome message (e.g., "Great to see you again!") may be displayed on the public channel 104 closest to the customer. Also, based on the timestamp metrics related to when the reoccurring customer usually arrives (e.g., saved in the cache of the WIFI access node 200 or in a profile in the database 204), the WIFI access node 200 may be able to determine, based on a substantially different timestamp associated with the mobile user device 108 when the user arrives, that the reoccurring user is running late and display a message ("Running late today?) on the public channel 104.

In addition, according to one embodiment, if the WIFI access node 200 within an establishment knows that the establishment is close to another business, the WIFI access node 200 may assume that a reoccurring visitor at the establishment works at the business and may provide content related to the business to the user's mobile device 108 or to the public channel 104 in proximity to the user.

In another example, the engagement system 100 may be utilized to identify pairs of mobile user devices 108 that are commonly sensed together within range of the WIFI access node 200 (e.g., from a husband and wife, from two people that work together, etc.) If the WIFI access node 200 senses the MAC addresses of the same mobile user devices within range of the WIFI access node 200 at the same time and this occurs repeatedly (i.e., it is verified against stored identification, location and timestamp metrics), then the WIFI access node 200 is able to determine that either a single user using two mobile user devices 108 is present and is visiting regularly or two users are likely visiting together on a reoccurring basis.

In response to determining that a pair of devices 108 has come within range of the WIFI access node 200 on a reoccurring basis, content tailored to two familiar people may be broadcast on the public channel 104. For example, if two friends visit a store on a reoccurring basis, due the continuing reoccurrence of their MAC addresses within the store, a WIFI access node 200 may recognize that the users of the two devices are probably visiting together, may determine an association between the two devices/users, and may display a resulting message (e.g., "Do you know about our two-for-one offers?) tailored to that fact when the users come within range of the WIFI access node. This message may be determined based on the presence of both devices/users at a concurrent time.

According to another embodiment, a WIFI access node 200 is able to associate devices based on discovery patterns (e.g., pattern matching for time, location and/or content). For example, if a WIFI access node 200 identifies a reoccurring pattern with regards to a reoccurring MAC address (e.g., a user that appears at the same time each day), but one day the WIFI access node 200 identifies a different mobile user device 108 performing the same pattern, the WIFI access node 200 may assume that the different mobile user device 108 is actually related to the reoccurring MAC address (i.e. reoccurring user) and merge or associate profiles or identification information of the two devices.

The relationship between the two devices may be further validated by additional public broadcast information from the mobile user devices 108. For example, the mobile user device 108 may also typically broadcast a Service Set Identifier (SSID) or Basic Service Set Identifier (BSSID) of a network that it has previously connected to in an effort to reconnect with the network. If the reoccurring mobile user device 108 is not identified and the newly sensed mobile user device 108 follows the same pattern as the reoccurring mobile user device 108 typically does and also broadcasts the same network identifier, then the WIFI access node 200 will assume that the same user is using both devices.

According to one embodiment, the engagement system 100 may be used to recognize that a user is present in a specific location. For example, within a home automation system including an engagement system 100, settings of utility devices (e.g., lighting levels, speaker volume levels, thermostat levels, etc.) within the home may be adjusted based on a sensed mobile user device 108. When a user walks into a room of her home and the WIFI access node 200 within the room, with a broadcast range limited to the room, senses the user's presence (via her mobile user device's 108 broadcast identification), the WIFI access node 200 may automatically send signals to the utility devices (coupled to the same LAN) to set the utility devices to preprogrammed settings.

For example, based on preprogrammed settings, the WIFI access node 200 may turn on lights, turn up a stereo system or turn up the temperature of a thermostat when the presence of the user is identified. In addition, the WIFI access node 200 may turn down the lights, turn down the stereo or turn down the temperature when the user goes outside the broadcast range of the WIFI access node 200 (e.g., the user leaves the room).

In another example, the WIFI access node 200 may be used to determine that a user is attending a specific event. For example, a WIFI access node 200 at a sport venue or convert venue may sense that a user's mobile user device 108 is present (by sensing the device's MAC address). Upon sensing the presence of the device 108 at a specific time, the WIFI access node 200 can access a schedule via the external network 106 in order to determine whether there is at a sport or concert event at that specific time. If there is a scheduled event, the WIFI access node 200 can provide sports or concert related information to the user directly via the user's mobile user device 108 or via a public channel 104 in the presence of the user.

In addition, based on the fact that a user is present at a sport or concert event or located in a specific location, the WIFI access node 200 may be able to correlate additional demographic information with the user and store the demographic information in a profile related to the user. For example, attendance at a sporting event may be used by a system to determine that the user is a supporter of the home team, attendance at a specific rock convert may identify the user as a male, urban, thirty-forty year old in a certain income level, or identifying a morning commute which starts in a certain neighborhood may identify the user in a certain demographic. Based on the additional demographic information, the WIFI access node 200 may provide related content to a user.

In another example, a MAC address sensed by a WIFI access node 200 may be used as one passive factor in a multi-factor authentication system. For instance, if a user wants to access a restricted computer system (e.g., a publically available desktop or ATM), in addition to an active step taken by the user (e.g., the entering of a password by the user), the restricted computer system coupled to a WIFI access node 200 may also require that the access node 200 actually sense the presence of the supposed user who is attempting to log in. The access node 200 may be familiar with the users MAC address through prior contact or through a registration process.

In one more example, the engagement system 100 may be utilized as a way-finding system. For example, if a first WIFI access node 200 of a plurality of WIFI access nodes recognizes that a mobile user device 108 is currently within its broadcast range but also receives information from other WIFI access nodes coupled to the same external network 106 that the user passed through their broadcast areas prior to being sensed by the first WIFI access node 200, the first WIFI access node 200 can provide information to the user (via the users mobile device 108 or a public channel 104) that the user could have travelled a different (potentially shorter or faster) route to the first WIFI access node 200.

As discussed above, in addition to providing content based on identification, location and timestamp metrics, by actually connecting to the wireless network provided by a WIFI access node 200, the WIFI access node 200 can provide content based on additional information determined while the user is connected or information provided by the user to become connected.

Figure 4:
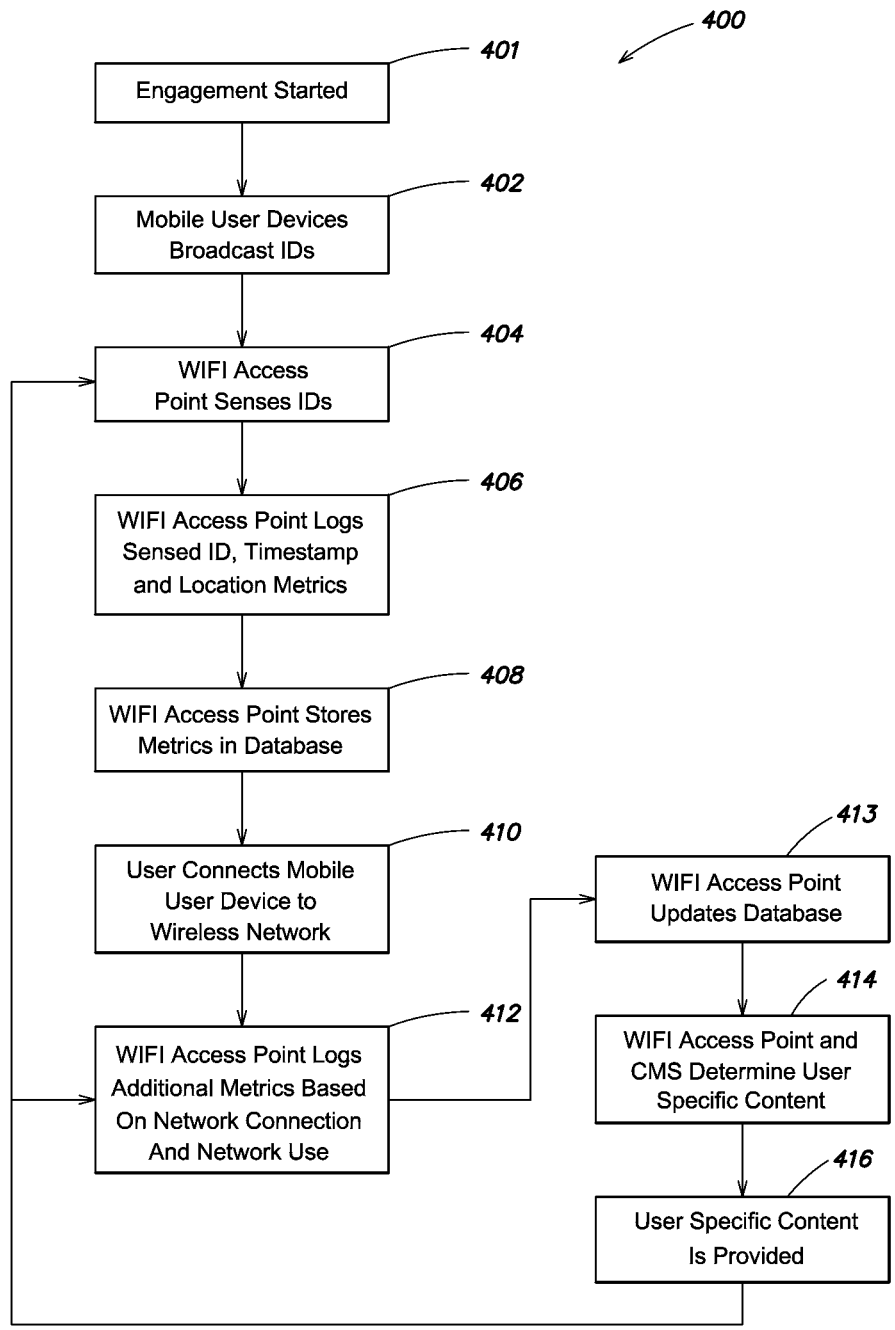
FIG. 4 is a flow chart illustrating an engagement process for gathering passive and active analytics in accordance with aspects of the present invention.

FIG. 4 is a flow chart 400 illustrating an engagement process for gathering passive and active analytics in accordance with one embodiment of the present invention. At block 401, the engagement process for gathering passive and active analytics is started at an engagement system 100 installed at a location.

At block 402, mobile user devices 108 at the location broadcast identification information (e.g., a MAC address) in an attempt to be discovered by a wireless access point. Even if the user of the mobile user device 108 is not actively trying to connect to a wireless network (e.g., the mobile user device is currently not being operated by the user), the mobile user device 108 may still be broadcasting its identification information.

At block 404, the WIFI access node 200 senses identification information broadcasted by any mobile user devices 108 within its broadcast range. At block 406, upon sensing that at least one mobile user device 108 is in its presence, the WIFI access node 200 logs the sensed identification information that the node 200 received from the mobile user device along with additional sensed timestamp and location metrics.

At block 408, the WIFI access node 200 stores the logged metrics in the registration database 204. As discussed above, the stored metrics may be used to provide user specific content to the user of the mobile user device 108. In addition, as also discussed above, the stored metrics may be accessed by a third party.

At block 410, the user connects their mobile user device 108 to a wireless network provided by the WIFI access node 200. Upon coupling their device 108 to the network, the user is able to utilize a web browser on the device 108 to browse the internet.

At block 412, as discussed above, the WIFI access node 200 senses additional information related to the mobile user device 108, the user and the use of the mobile user device 108 (e.g., content viewed) on the wireless network. Based on the additional information, the WIFI access node 200 logs additional metrics related to the user and mobile user device 108.

At block 413, the WIFI access node 200 updates the information stored in the database (e.g., updates the profiles with the additional metrics) related to the mobile user device 108 connected to the network.

At block 414, based on a determination of which mobile user devices 108 are within range of the WIFI access node 200 and based on the stored metrics, the CMS 202 and the WIFI access node 200 determine which user specific content to provide to the users of the mobile user devices 108. According to one embodiment, the content may be local content provided by the engagement system 100 or content received from the external network 106.

At block 416, the user specific content is provided to at least one of the mobile user devices 108 within range of the WIFI access node 200. As discussed above, the user specific content may be provided to one or more of the mobile user devices 108 directly. The content may also be broadcast to the public over a public channel 104 such as a public video display or speaker. In addition, the content may be in the form of signals sent to control an external device. As a result, be retrieving passive information related to the presence of a mobile user device 108 and active information related to the mobile user device 108, the user of the mobile device 108 and the use of the mobile device 108, the WIFI access node 200 is able to provide relevant user specific content.

According to one embodiment, once the WIFI access node 200 has sensed the presence of a mobile user device 108 and the mobile user device 108 has been connected to the wireless network provided by the WIFI access node 200, the WIFI access node 200 may monitor usage of the mobile user device 108. For example, while the mobile user device 108 is coupled to the network provided by the WIFI access node 200 and the user is utilizing a web browser to access the internet, the WIFI access node 200 may retrieve and store information related to the user's web browser use.

In one embodiment, the WIFI access node 200 monitors such information as the content of the web pages viewed by the user, the cookies saved to the mobile user device 108, items purchased via the web browser, online shows viewed, music listened to and any other information related to the browsing activity of the user. Based on the mobile user device 108 activity in addition to the passive location, timestamp and identification analytics, the WIFI access node 200 may provide specific and/or special content to the user via the mobile user device or the public channel 104.

The WIFI access node 200 may provide special advertising material or product information to a user (via the device 108 or public channel 104) operating a mobile user device 108 within range of the WIFI access node 200 if the WIFI access node 200 determines that the user may be interested in such material (e.g., due to prior use of the web browser or prior purchases made via the web browser). For example, if while connected to the WIFI access node 200, the user utilizes the mobile user device 108 to repeatedly view content related to a specific product and/or even to buy the specific product, the WIFI access node 200 can sense and store this web browser use information. When the WIFI access node 200 recognizes the mobile user device is within the broadcast area of the WIFI access node 200 (i.e. via the sensed MAC address), the WIFI access node 200 can provide special content (e.g., a special product offer) related to the specific product directly to the mobile user device 108 or to a public channel 104 near the mobile user device 108.

The WIFI access node 200 may also provide special or focused content to the user if the WIFI access node 200 determines that the mobile user device 108 (and hence the user) is relatively close to a product that the user may be interested in (based on browser use). According to one embodiment, the WIFI access node 200 uses wireless triangulation to determine the location of the mobile user device 108. In another embodiment, the WIFI access node 200 may use the strength of signals received from the mobile user device 108 to determine a relative location of the mobile user device 108.

In another example, the WIFI access node 200 may include a proxy server that is configured to remove a portion of ads or all ads on a web page visited by the user on the mobile user device 108. In one embodiment, the proxy server is configured to replace the ads with user specific content related to the use of the browser by the user on the mobile user device 108.

According to another embodiment, the WIFI access node 200 may receive information from the mobile user device 108 related to Near Field Communication (NFC) transactions or other payment methods using a mobile device. When a user utilizes their mobile user device 108 to directly purchase a product (e.g., by scanning a code or barcode with the mobile user device 108) the WIFI access node 200 receives information related to the transaction. Based on the information related to the transaction (e.g., product, purchase price, etc), the WIFI access node 200 may provide related content (e.g., related product, similar product, product offers, information regarding the purchased product, etc.) to the user. In one example, in addition to stored purchase information (e.g., saved in the user's related profiled in the database), the WIFI access node 200 may use the passive identification and location metrics to determine when the user has entered a store and in response to the user entering the store, the WIFI access node 200 may send content to the user, via the mobile user device 108 or public signage 104, to spotlight items that the user purchases frequently.

In another example, in response to purchase and location information received by the WIFI access node 200, the WIFI access node 200 may provide a message specifically to the user. For example, upon sensing that a user has entered a coffee shop, the WIFI access node 200 may recall prior purchase information and display a message ("Tall mocha skim latte?") related to a prior purchase pattern of the user. In another example, upon sensing that a user has entered a store, the WIFI access node 200 may recall prior purchase, demographic and interest information and display the information on a display of a sales associate so that the sales associate can help the user more efficiently.

In another embodiment, the WIFI access node 200 monitors use of the mobile user device 108 to play games or answer polls by the user. Not only can the WIFI access node 200 provide information to the user related to the content of the game or poll, but based on the passive identification and location metrics, the WIFI access node 200 may allow interactivity between users with regards to the game or poll. For example, using their mobile user devices, users may choose to interact with a game or poll displayed on a public channel 104 by scanning a Quick Response (QR) code shown on the public channel 104. Users may then answer a poll or play a game using their mobile user device 108. Based on the sensed mobile user devices that are determined to be present and the responses entered by the users in their mobile user devices 108, the WIFI access node 200 may display the results of the poll or game on the public channel 104. Also, a winner of a game may be provided special offers or prizes by the WIFI access node 200.

According to one embodiment, the WIFI access node 200 monitors online media content received by the user, via the mobile user device 108, and provides related information to the user. For example, if a user repeatedly watches a television show online, a WIFI access node 200 that senses the user's presence through their mobile user device 108 and also receives profile information from the database 204 indicating that the television show is one of the user's favorites, may choose to play a trailer for the television shown on a public channel 104 when the user is in its presence.

In another example, if a user repeatedly listens to a certain radio station or a certain type of music through an internet radio station, a WIFI access node 200 that senses the user's presence through their mobile user device 108 and also receives profile information from the database 204 indicating that user prefers a certain type of music, the WIFI access node 200 may choose to play music of the desired type through the mobile user device 108 or even through a public speaker. For instance, if a user walks into a waiting room, a WIFI access node 200 in the waiting room senses the presence of the user (via the MAC address of the mobile user device 108), and the WIFI access node 200 retrieves a profile (including music preference information) for the user from the database 204 via an API, the WIFI access node 200 may choose to play a related song on a public channel 104 speaker.

According to one embodiment, even if another WIFI network provided by a different source is available, it may be beneficial to connect to the WIFI access node 200 as the WIFI access node 200 stores some content locally. For example, in one embodiment the WIFI access node 200 is a Content Delivery Network (CDN) which caches web content to reduce network traffic and speed up browsing performance. Providing content from a CDN allows the WIFI access node 200 to quickly provide a reliable high quality stream of content to at least one of the mobile user devices 108.

For example, a user may begin watching a trailer for a movie while he is in a subway car by streaming the trailer from the WIFI access node. As the user exits the car, the WIFI access node 200 in the train may recognize that the user is no longer present, may stop streaming the trailer and may store in a profile of the user the location in the media (e.g., timestamp) at which point the stream failed.

However, as the user exits the subway car, a plurality of WIFI access nodes 200 outside of the subway car may begin to sense the presence of the mobile user device 188 and recognize that the media being viewed by the user was interrupted. Based on an identification of the mobile user device 108 (via its MAC address), the location of the mobile user device and the previously stored information regarding the streaming media previously viewed by the user, another WIFI access node 200 external from the subway car may automatically begin playing the streamed content from where the other WIFI access node 200 left off, on a public channel 104 visible to the user.

In addition to the sensed active and passive analytics discussed above, the engagement system may obtain even more information from users if users are asked to register or enter different credentials before they are allowed to connect to the network of the WIFI access node 200.

Figure 5:
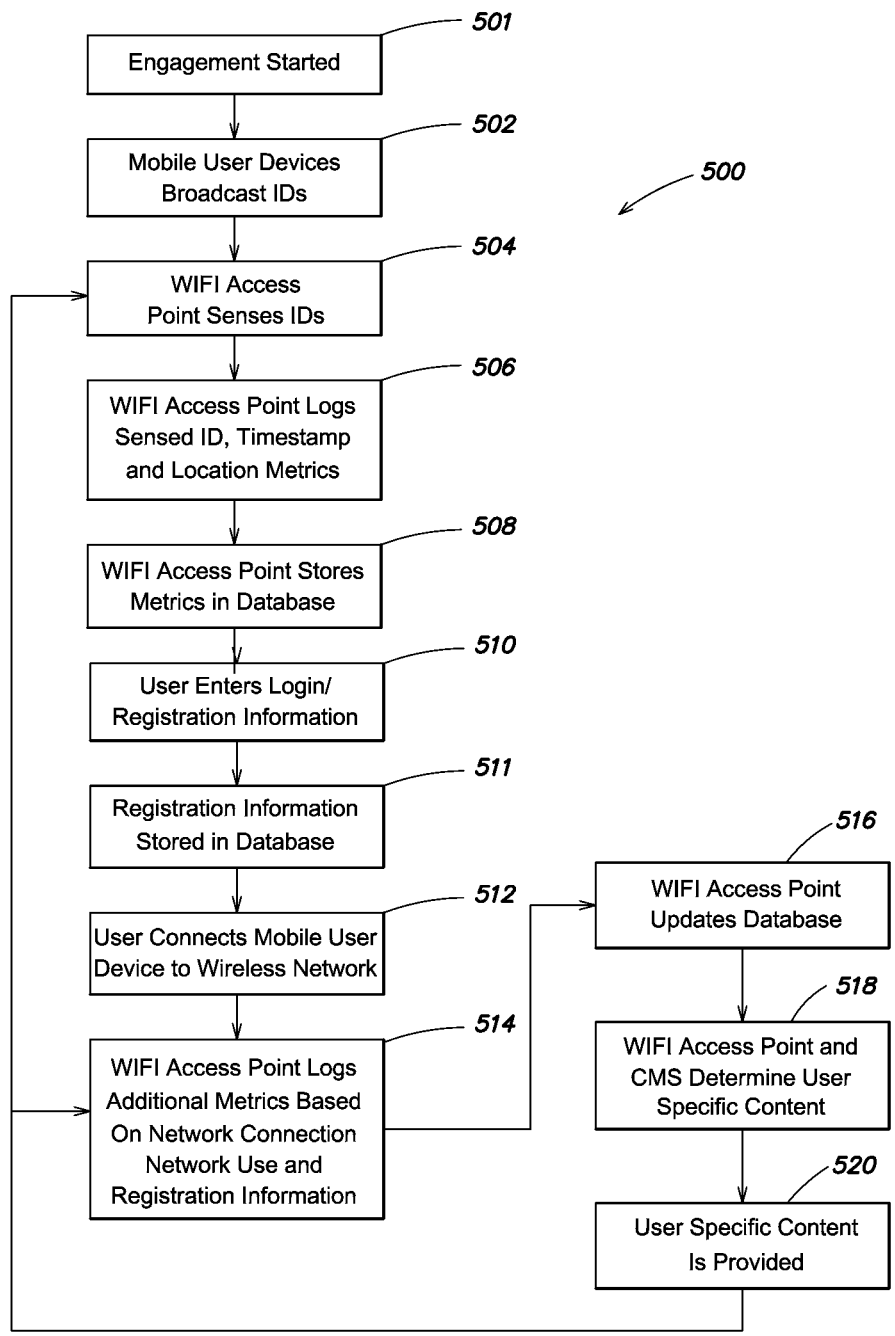
FIG. 5 is a flow chart illustrating another engagement process for gathering passive and active analytics in accordance with aspects of the present invention.

FIG. 5 is a flow chart 500 illustrating another engagement process for gathering passive and active analytics in accordance with one embodiment of the present invention. At block 501, the engagement process for gathering passive and active analytics is started at an engagement system 100 installed at a location.

At block 502, mobile user devices 108 at the location broadcast identification information (e.g., a MAC address) in an attempt to be discovered by a wireless access point. Even if the user of the mobile user device 108 is not actively trying to connect to a wireless network (e.g., the mobile user device is currently not being operated by the user), the mobile user device 108 may still be broadcasting its identification information.

At block 504, the WIFI access node 200 senses identification information broadcasted by any mobile user devices 108 within its broadcast range. At block 506, upon sensing that at least one mobile user device 108 is in its presence, the WIFI access node 200 logs the sensed identification information the node 200 received from the mobile user device along with additional sensed timestamp and location metrics.

At block 508, the WIFI access node 200 stores the logged metrics in the registration database 204. As discussed above, the stored metrics may be used to provide user specific content to the user of the mobile user device 108. In addition, as also discussed above, the stored metrics may be accessed by a third party.

At block 510, the user provides login or registration information to the WIFI access node. The WIFI access node may require that a user wishing to connect to the wireless network enter credential information. For example, credential information may include the user's name, email address, phone number, social media contact information, or other credentials of the user. The credential information may also include user preferences, such as store preferences or product preferences. According to one embodiment, the WIFI access node may only require the user to enter credential information upon connecting to the network for the first time.

At block 511, the entered registration and credential information is stored in the database 204. According to one embodiment the registration and credential information is stored in a profile associated with the mobile user device 108.

At block 512, the user connects their mobile user device 108 to a wireless network provided by the WIFI access node 200. Upon coupling their device 108 to the network, the user is able to utilize a web browser on the device 108 to browse the internet.

At block 514, as discussed above, the WIFI access node 200 senses additional information related to the mobile user device 108, the user and the use of the mobile user device 108 (e.g., content viewed) on the wireless network. Based on the additional information, the WIFI access node 200 logs additional metrics related to the user and mobile user device 108.

At block 516, the WIFI access node 200 updates the information stored in the database (i.e., updates the profiles related to the identified mobile user devices 108) with the additional metrics.

At block 518, based on a determination of which mobile user devices 108 are within range of the WIFI access node 200 and based on the stored metrics, the CMS 202 and the WIFI access node 200 determine which user specific content to provide to the users of the mobile user devices 108. According to one embodiment, the content may be local content provided by the engagement system 100 or content from the external network 106.

At block 520, the user specific content is provided to at least one of the mobile user devices 108 within range of the WIFI access node 200. As discussed above, the user specific content may be provided to one or more of the mobile user devices 108 directly. The content may also be broadcast to the public over a public channel 104 such as a public video display or speaker. In addition, the content may be in the form of signals sent to control an external device. As a result, by sensing passive information related to the presence of a mobile user device 108, active information related to the mobile user device 108, the user of the mobile device 108 and the use of the mobile device 108, and registration information input by a user, the WIFI access node 200 is able to provide relevant user specific content.

According to one embodiment, based on identification information entered by the user, the WIFI access node 200 retrieves information from an external third party (e.g., via the external network 106). For example, based on the credentials entered by the user, the WIFI access node 200 may retrieve information from a store rewards account. Using this information, when a mobile user device 108 is identified as entering the store with the rewards account, the WIFI access node 200 may provide specific content to the user related to information retrieved from the store rewards account (e.g., purchases made, related offers, reward information etc.). As discussed above, the specific content can be provided directly to the mobile user device 108 of the user, displayed on a public channel 104 or even displayed privately to a sales associate.

According to another embodiment, based on the identification information entered by the user, the WIFI access node 200 may retrieve information from a social media account. For example, the WIFI access node 200 may retrieve "friend" information from the social media network. Using this information, the WIFI access node 200 may be able to tell a user when friends in their network (whose MAC addresses and locations have also been sensed within the broadcast are of the WIFI access node 200) are in the same area. Using the "friend" information, the WIFI access node may also be able to inform a user about scores his friend achieved on a game that the user is also playing on their mobile user device 108.

In another embodiment, based on preference information entered by the user, the WIFI access node 200 may provide content related to the preference information to the user. For example, if the user indicates that she prefers a certain type of music when initially registering with the WIFI access node, when the WIFI access node 200 in a music store recognizes that the user is present in the store, the WIFI access node 200 may provide content specific to the preferred music to the user.

As described above, embodiments described herein provide an engagement system for identifying users based on their mobile devices' hardware address, selecting and delivering tailored content and marketing to the user's physical space and/or mobile device, and gathering passive (presence) and/or active (usage) analytics.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A system for providing user specific content, the system comprising:
   a first wireless access node configured to:
   couple to an external network; and
   passively receive a first hardware address of a first local mobile device broadcast by the first local mobile device within range of the first wireless access node absent a communication channel being created between the first wireless access node and the first local mobile device subsequent to the first wireless access node passively receiving the first hardware address of the first local mobile device;
   a second wireless access node configured to:
   couple to the external network; and
   passively receive the first hardware address of the first local mobile device broadcast by the first local mobile device within range of the second wireless access node absent a communication channel being created between the second wireless access node and the first local mobile device subsequent to the second wireless access node passively receiving the first hardware address of the first local mobile device;
   a content management system coupled to the first wireless access node and the second wireless access node;
   a first digital display coupled to the first wireless access node, the first digital display being separate from a first display of the first local mobile device and being in a vicinity of a first user of the first local mobile device at a first time; and
   a second digital display coupled to the second wireless access node, the second digital display being separate from the first display of the first local mobile device and being in a vicinity of the first user of the first local mobile device at a second time subsequent to the first time;
   wherein:
   the content management system is configured to:
   provide, at the first time, a first portion of content related to the first user of the first local mobile device to the first digital display in response to the first wireless access node passively receiving the first hardware address of the first local mobile device, wherein the first digital display is configured to display the first portion of the content, wherein providing the content comprises:
   providing the content absent connection of the first local mobile device to the first wireless access node and the content management system; and
   providing the content absent registration of the first local mobile device with the first wireless access node and the content management system;
   determine that display of the content was interrupted subsequent to the first portion of the content being displayed on the first digital display and prior to a second portion of the content being displayed on the first digital display; and
   provide, at the second time, the second portion of the content related to the first user to the second digital display in response to the second wireless access node passively receiving the first hardware address of the first local mobile device, wherein the second digital display is configured to display the second portion of the content, wherein providing the content comprises: providing the content absent connection of the first local mobile device to the second wireless access node and the content management system; and providing the content absent registration of the first local mobile device with the second wireless access node and the content management system.

2. The system of claim 1, wherein the first hardware address comprises a Media Access Control (MAC) address.

3. The system of claim 1, wherein the first digital display comprises a digital sign.

4. The system of claim 1, wherein the system further comprises a database coupled to the first wireless access node and wherein the first wireless access node is further configured, in response to receiving the first hardware address of the first local mobile device, to create a profile within the database associated with the first local mobile device.

5. The system of claim 4, wherein the first wireless access node is configured to include, in the profile associated with the first local mobile device, the first hardware address of the first local mobile device, a location of the first local mobile device, and a time at which the first wireless access node received the first hardware address of the first local mobile device.

6. The system of claim 5, wherein providing content related to the first user of the at least first local mobile device to the first digital display includes providing information associated with of the first hardware address of the first local mobile device, the location of the first local mobile device, and the time at which the first wireless access node received the first hardware address of the first local mobile device.

7. The system of claim 6, wherein the content management system is configured to retrieve the content from the database.

8. The system of claim 6, wherein the content management system is configured to retrieve the content from the external network.

9. The system of claim 6, wherein:
the first wireless access node is configured to include, in the profile associated with the first local mobile device, prior usage information associated with the first local mobile device; and
the content management system is configured to provide information associated with the prior usage information associated with the first local mobile device to the first digital display.

10. The system of claim 1, wherein:
the first wireless access node is configured to passively receive a second hardware address of a second local mobile device broadcast by the second local mobile device within range of the first wireless access node absent a communication channel being created between the first wireless access node and the second local mobile device subsequent to the first wireless access node passively receiving the second hardware address of the second local mobile device;
the content management system is configured to provide content related to a second user of the second local mobile device to the first digital display in response to the first wireless access node passively receiving the second hardware address of the second local mobile device, wherein providing the content related to the second user comprises: providing the content related to the second user absent connection of the second local mobile device to the first wireless access node and the content management system; and providing the content related to the second user absent registration of the second local mobile device with the first wireless access node and the content management system; and
the first digital display is separate from a second display of the second local mobile device, in a vicinity of the second user of the second local mobile device, divided into at least two segments, and configured to simultaneously display the content related to the first user in a first segment of the first digital display and the content related to the second user in a second segment of the first digital display.

11. The system of claim 1, wherein:
the first wireless access node is configured to passively receive a second hardware address of a second local mobile device broadcast by the second local mobile device within range of the first wireless access node absent a communication channel being created between the first wireless access node and the second local mobile device subsequent to the first wireless access node passively receiving the second hardware address of the second local mobile device;
the content management system is configured to provide the content to the first digital display in response to the first wireless access node passively receiving the first hardware address of the first local mobile device and the second hardware address of the second local mobile device, wherein the content is of common interest to the first user of the first local mobile device and a second user of the second local mobile device, wherein providing the content comprises: providing the content absent connection of the second local mobile device to the first wireless access node and the content management system; and providing the content absent registration of the second local mobile device with the first wireless access node and the content management system; and
the first digital display is separate from a second display of the second local mobile device, in a vicinity of the second user of the second local mobile device, and configured to display the content of common interest to the first user and the second user.

12. A method for providing user specific content, the method comprising acts of:
passively receiving wirelessly, with a first server, a hardware address of at least one mobile device which is broadcast by the at least one mobile device within a proximity of the first server absent a communication channel being created between the first server and the at least one mobile device subsequent to the first server passively receiving wirelessly the hardware address of the at least one mobile device;
retrieving, with a content management system, in response to the first server passively receiving the hardware address of the at least one mobile device, a first portion of content associated with a user of the at least one mobile device absent registration of the at least one mobile device to the first server and the content management system;
providing, at a first time, absent connection of the at least one mobile device to the first server and the content management system, the first portion of the content to the user of the at least one mobile device via a first digital display that is separate from a display of the at least one mobile device and is in a vicinity of the user of the at least one mobile device at the first time, wherein the first digital display is configured to display the first portion of the content;
determining that display of the content was interrupted subsequent to the first portion of the content being displayed on the first digital display and prior to a second portion of the content being displayed on the first digital display;
passively receiving wirelessly, with a second server, the hardware address of the at least one mobile device which is broadcast by the at least one mobile device within a proximity of the second server absent a communication channel being created between the second server and the at least one mobile device subsequent to the second server passively receiving wirelessly the hardware address of the at least one mobile device;

retrieving, with the content management system, in response to the second server passively receiving the hardware address of the at least one mobile device, the second portion of the content associated with the user of the at least one mobile device absent registration of the at least one mobile device to the second server and the content management system; and providing, at a second time subsequent to the first time, absent connection of the at least one mobile device to the second server and the content management system, the second portion of the content to the user of the at least one mobile device via a second digital display that is separate from a display of the at least one mobile device and is in a vicinity of the user of the at least one mobile device at the second time, wherein the second digital display is configured to display the second portion of the content.

13. The method of claim 12, further comprising:

recording, with the first server, absent connection of the at least one mobile device to the first server, the hardware address, a location of the at least one mobile device, and a time at which the first server passively received the hardware address, in a database; and retrieving the first portion of the content based on at least one of the received hardware address, the location of the user, and the time at which the hardware address was received.

14. The method of claim 13, further comprising retrieving the first portion of the content from at least one of the database or an external network.

15. The method of claim 12, wherein retrieving the second portion of the content comprises retrieving prior usage information associated with the at least one mobile device.

16. A system for providing user specific content, the system comprising:

a first server configured to:
couple to an external network; and
passively receive a hardware address of a first local mobile device broadcast by the first local mobile device within proximity of the first server absent a communication channel being created between the first server and the first local mobile device subsequent to the first server passively receiving the hardware address of the first local mobile device;

a first digital display coupled to the first server, the first digital display being separate from a display of the first local mobile device and being in a vicinity of a user of the first local mobile device at a first time;

a second server configured to:
couple to the external network; and
passively receive the hardware address of the first local mobile device broadcast by the first local mobile device within proximity of the second server absent a communication channel being created between the second server and the first local mobile device subsequent to the second server passively receiving the hardware address of the first local mobile device;

a second digital display coupled to the second server, the second digital display being separate from a display of the first local mobile device and being in a vicinity of the user of the first local mobile device at a second time subsequent to the first time; and a content management system configured to:
provide, at the first time, absent connection of the first local mobile device to the first server and to the content management system, and absent registration of the first local mobile device to the first server and to the content management system, a first portion of user specific content to the first digital display in response to the first server passively receiving the hardware address;

determine that display of the user specific content was interrupted subsequent to the first portion of the user specific content being displayed on the first digital display and prior to a second portion of the user specific content being displayed on the first digital display; and provide, at the second time, absent connection of the first local mobile device to the second server and to the content management system, and absent registration of the first local mobile device to the second server and to the content management system, the second portion of the user specific content to the second digital display in response to the second server passively receiving the hardware address.

17. The system of claim 16, wherein the content management system is configured to determine the user specific content based on at least one of an identification of the first local mobile device, a location of the first local mobile device, and a time at which the first server received the hardware address of the first local mobile device.

18. The system of claim 17, wherein the content management system is configured to determine the user specific content based on a discovery pattern associated with at least one of the identification the first local mobile device, the location of the first local mobile device, and the time at which the first server received the hardware address of the first local mobile device.

19. The system of claim 16, wherein the content management system is configured to determine the user specific content based on prior usage information of the first local mobile device over the external network.

20. The system of claim 16, wherein the server is further configured to receive a hardware address of a second local mobile device broadcast by the second local mobile device within proximity of the first server and wherein the user specific content is based on an association with the second local mobile device.

21. The system of claim 16, wherein the content management system is configured to determine the user specific content based on transaction information related to the user of the first local mobile device.

22. The system of claim 21, wherein the transaction information includes Near Field Communication (NFC) transaction information.

* * * * *

UNITED STATES PATENT AND TRADEMARK OFFICE
CERTIFICATE OF CORRECTION

PATENT NO. : 10,349,236 B2  
APPLICATION NO. : 13/465384  
DATED : July 9, 2019  
INVENTOR(S) : Colin O'Donnell et al.

Page 1 of 1

It is certified that error appears in the above-identified patent and that said Letters Patent is hereby corrected as shown below:

In the Claims

At Column 19, Claim 6, Line 13, please delete the words "at least".

At Column 19, Claim 6, Line 15, please change: "associated with of the first hardware address of the first local" to --associated with at least one of the first hardware address of the first local--.

Signed and Sealed this
Twenty-first Day of January, 2020

Andrei Iancu
*Director of the United States Patent and Trademark Office*